(12) United States Patent
Rodgers

(10) Patent No.: US 6,545,665 B2
(45) Date of Patent: Apr. 8, 2003

(54) ADJUSTABLE COMPUTER POINTING DEVICE

(76) Inventor: Bruce Rodgers, 241 E. Fawsett Rd., Winter Park, FL (US) 32789

( * ) Notice: Subject to any disclaimer, the term of this patent is extended or adjusted under 35 U.S.C. 154(b) by 0 days.

(21) Appl. No.: 10/117,672

(22) Filed: Apr. 3, 2002

(65) Prior Publication Data

US 2002/0118174 A1 Aug. 29, 2002

Related U.S. Application Data

(63) Continuation-in-part of application No. 09/410,973, filed on Oct. 4, 1999, now abandoned.
(60) Provisional application No. 60/103,452, filed on Oct. 6, 1998.

(51) Int. Cl.[7] .................................................. G09G 5/08
(52) U.S. Cl. ........................................ 345/163; 345/157
(58) Field of Search ................................ 345/156, 157, 345/158, 160–161, 167–169, 163, 173, 179, 184, 700, 839; 341/20, 21, 23; 74/471, 469, 471 R; 273/148 B, 148 R; 463/1, 36–37; 248/118, 118.1; 382/113, 114

(56) References Cited

U.S. PATENT DOCUMENTS

| 4,760,217 | A | * | 7/1988 | Suzuki et al. ................. 200/5 |
| 4,862,165 | A | * | 8/1989 | Gart ............................ 341/20 |
| 5,570,112 | A | * | 10/1996 | Robinson ..................... 345/163 |
| 5,631,669 | A | * | 5/1997 | Stobbs et al. ................ 345/163 |
| 5,648,798 | A | * | 7/1997 | Hamling ...................... 345/163 |
| 5,880,715 | A | * | 3/1999 | Garrett ........................ 345/163 |
| 5,894,303 | A | * | 4/1999 | Barr ............................ 345/163 |
| 5,923,318 | A | * | 7/1999 | Zhai et al. ................... 345/157 |
| 6,016,138 | A | * | 1/2000 | Harskamp et al. .......... 345/163 |
| 6,040,539 | A | * | 3/2000 | Hiegel ...................... 200/302.1 |
| 6,072,471 | A | * | 6/2000 | Lo ............................... 345/163 |
| 6,099,929 | A | * | 8/2000 | Chinen ....................... 428/40.1 |
| 6,229,527 | B1 | * | 5/2001 | Shearn ........................ 345/163 |

* cited by examiner

Primary Examiner—Vijay Shankar
Assistant Examiner—Mansour M. Said

(57) ABSTRACT

A computer pointing device consists of a adjustable hand support shape and adjustable controls that work together to conform to an individuals natural grip. This allows multiple individual users to shape the device body for their maximum comfort using a squeezing action. A targeted ergonomic configuration allows a user to configure the angle of the hand in the most natural way to minimize twist and strain on the wrist. The adjustable structure and button assembly are attached to a flat bottomed base that rests on an underlying flat surface. Attached to the base are the electronic and the mechanical component necessary to provide the required positional and event outputs to a computer.

20 Claims, 12 Drawing Sheets

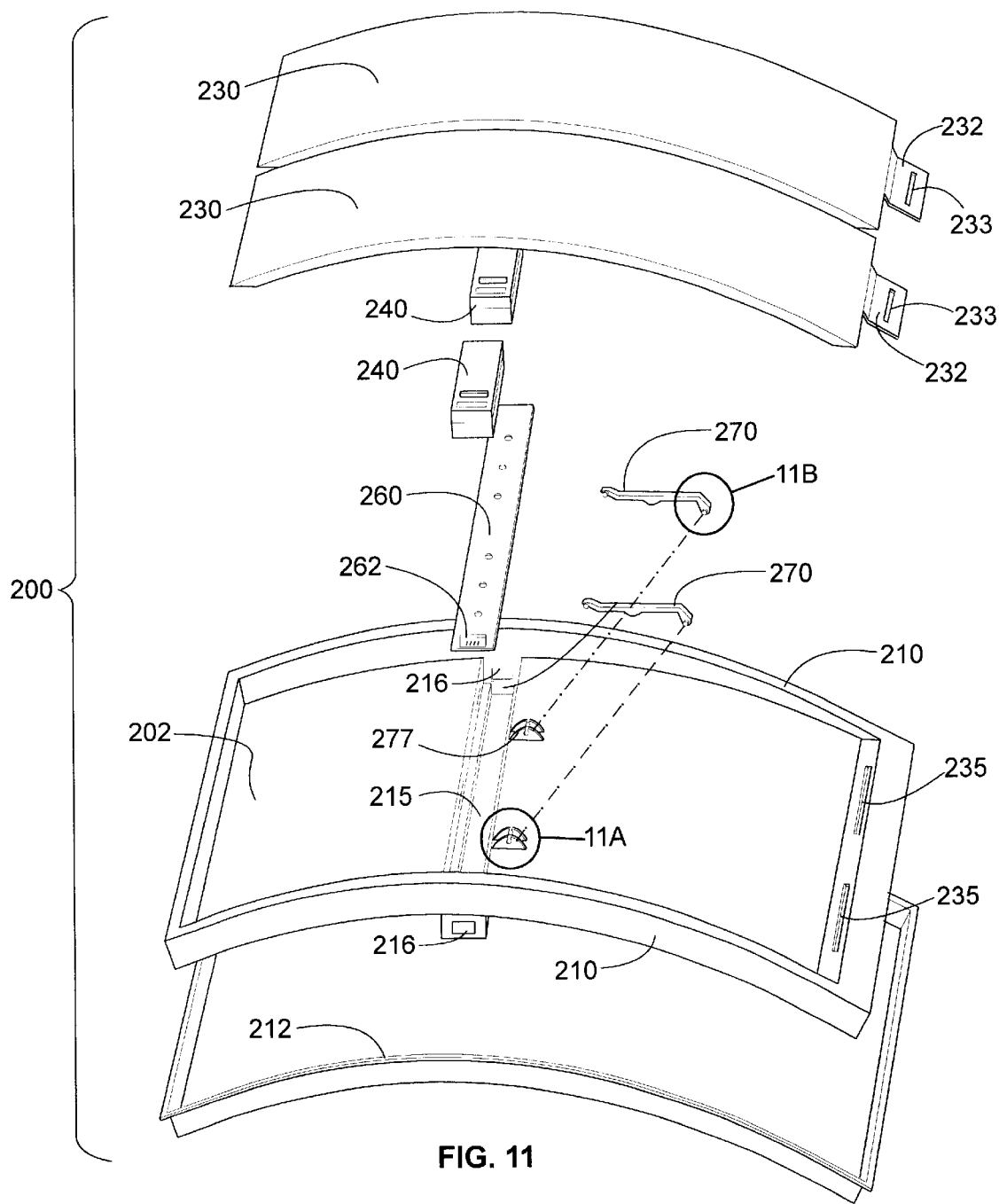
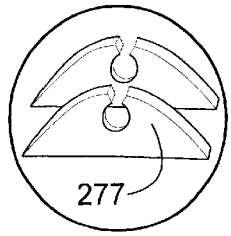
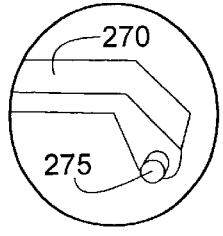
FIG. 11
FIG. 11A    FIG. 11B

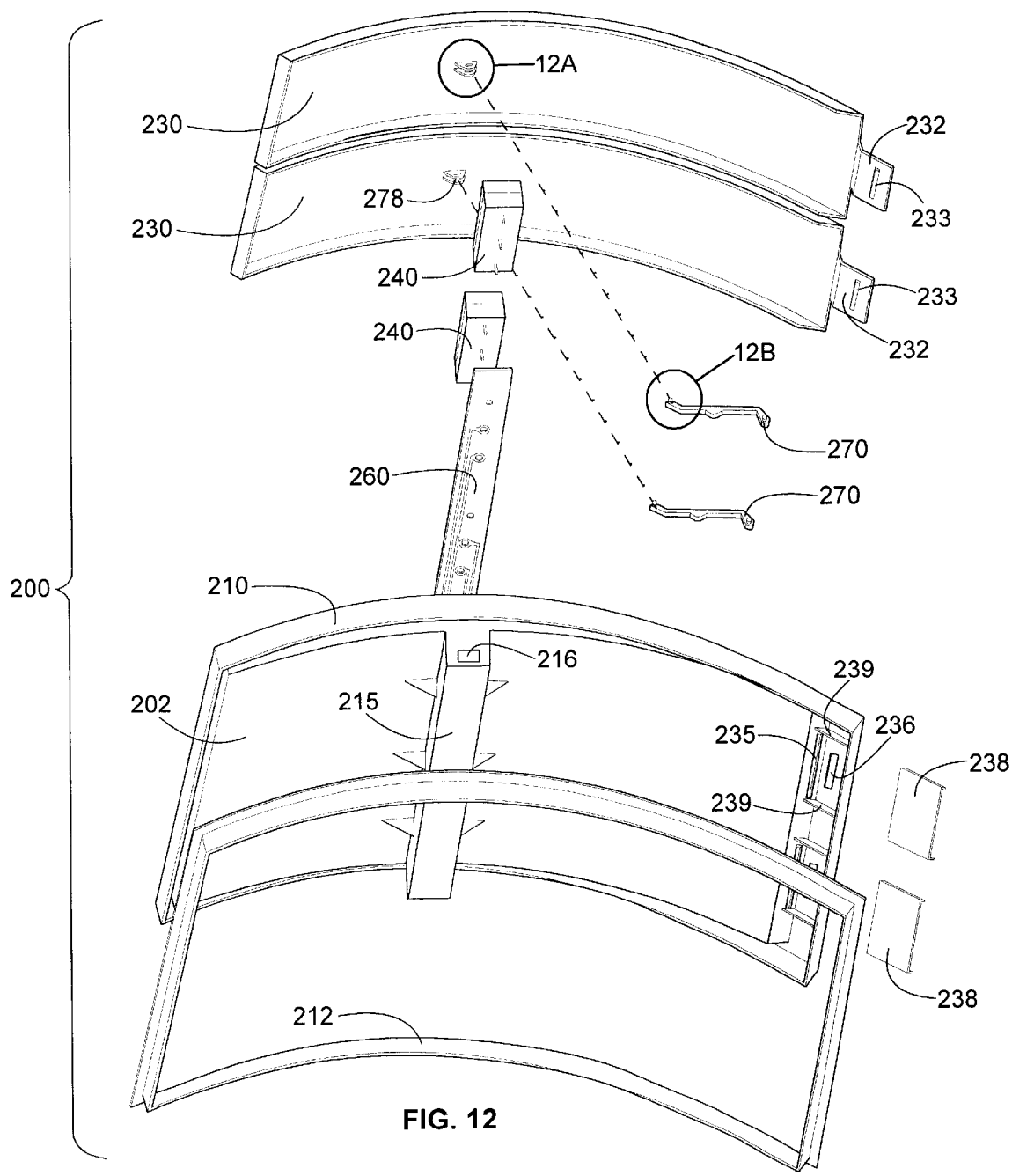
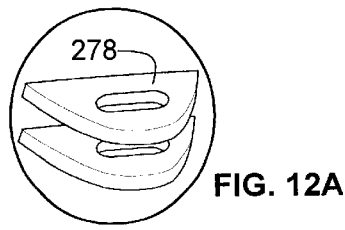
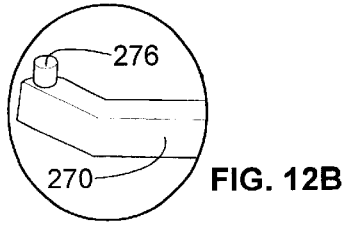
FIG. 12
FIG. 12A
FIG. 12B

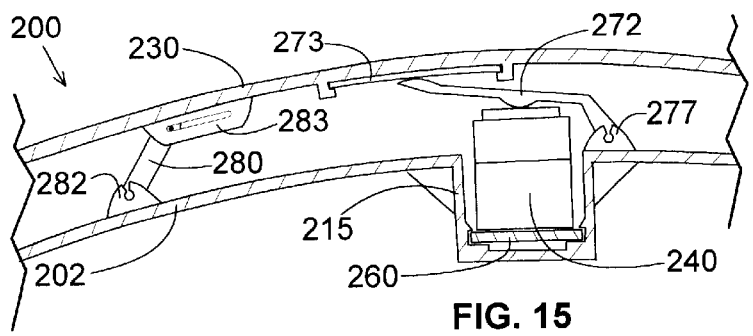
FIG. 15
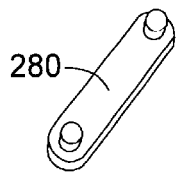
FIG. 15A
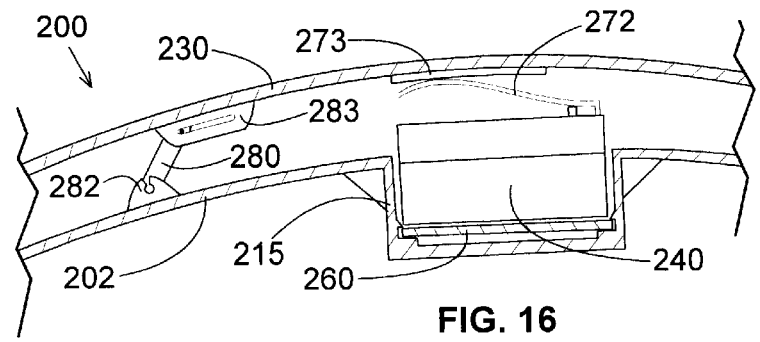
FIG. 16
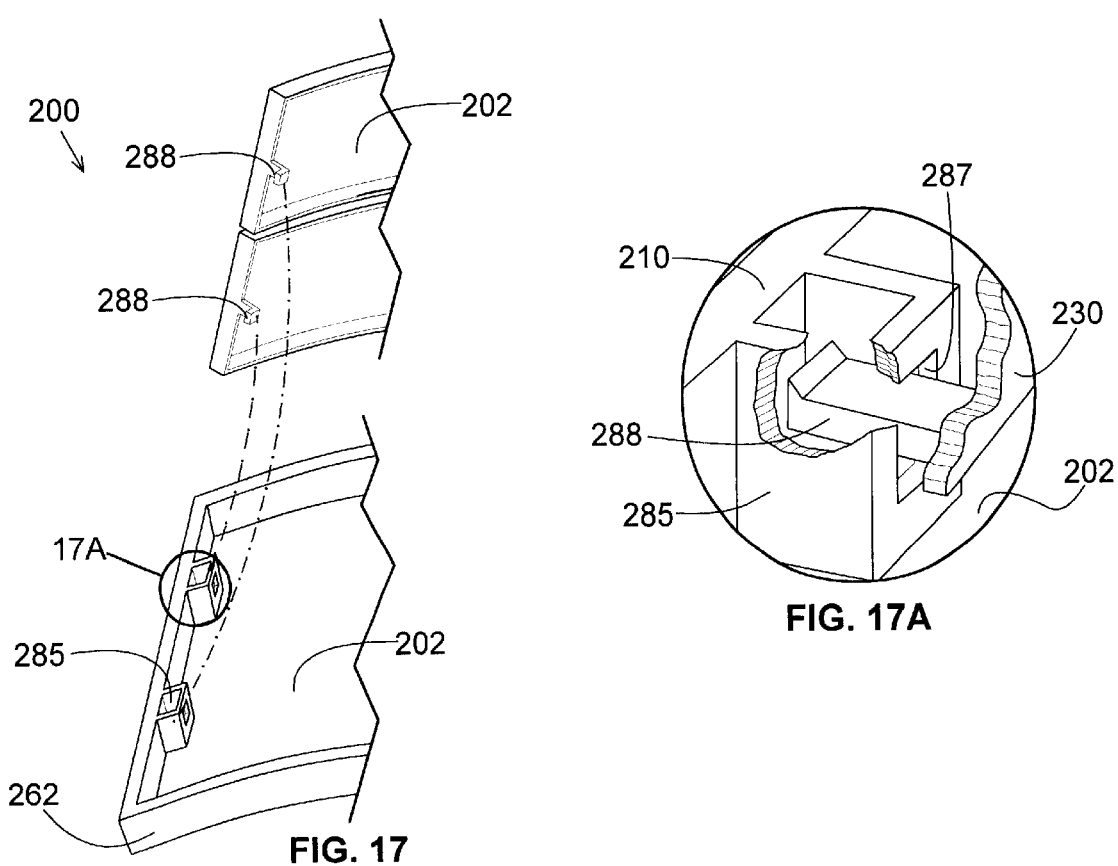
FIG. 17
FIG. 17A

ADJUSTABLE COMPUTER POINTING DEVICE

CROSS-REFERENCES TO RELATED APPLICATIONS

This application is a Continuation-in-part of application Ser. No. 09/410,973 filed Oct. 4, 1999, now abandoned which claims benefit of 60/103,452 filed Oct. 6, 1998, the specification of which is included herein by reference.

BACKGROUND OF THE INVENTION

The computer mouse is an input device used to provide control over the operations of a computer. It is usually used in conjunction with a graphical user interface where a cursor is moved around the screen by moving the mouse. When a button on the mouse is depressed, a signal is sent to the computer and acted upon by software applications running on the computer.

The use of the graphical user interface and accompanying software applications requires a great deal of interaction of the user with the mouse. Software applications designed for the creation and editing of graphics and digital images are especially dependent upon the mouse or similar input device. These applications are almost exclusively controlled by the mouse, resulting in constant movement of the mouse and activation of buttons.

There is a variety of computer mouse designs currently in use. This provides some relief to users looking for different sizes or various ergonomic characteristics. Most prior art mice have an horizontal orientation of the main control surface which is in contact with the upper portion of the user's palm. The buttons are located on this main control surface positioned so as to be under the user's index finger, middle finger, and on some mice, the ring finger. Most prior art mice have relatively vertical sides with the thumb and small finger contacting each side respectively. Thus they are designed to be gripped on the sides by the thumb and small finger of a hand held in an horizontal position.

There are some exceptions to the typical computer mouse design. The mouse sold under the trademark "MouseMan" as the Cordless MouseMan™ pro by Logitech Inc. in Fremont Calif., provides an alternative grip and hand position by having a convex curved main control surface with its tangent at an approximately a 45° angle from horizontal. On the right handed version of the Logitech MouseMan™ Pro, the left side is near vertical for gripping by the thumb. There is no vertical side on the right, so depending on hand size, the small finger may not touch the mouse, instead resting on the underlying stationary surface supporting the computer mouse. As a result, the hand is positioned up approximately 45° from horizontal in an attempt to provide a more natural relaxed hand position for controlling the mouse. The mouse described in U.S. Pat. No. 5,576,733 to Jack Lo, also attempts to promote a more natural and relaxed position as does U.S. Pat. No. 5,894,303 to Barr. The hand position shown is nearly upright, resting on the side of the palm and the small finger. Both Barr and Lo mice include a smaller thumb support and an undercut to position the small finger directly under the other fingers which can cause poor positioning of the small finger causing it rub against the ring finger. Also, both Barr and Lo mice have a relatively narrow base, especially considering the hi-profile nature of their designs.

Whether a computer mouse has the typical horizontal orientation or a more vertical orientation, each mouse is fixed in size and shape and promotes a specific hand position in order to grip and operate it. The chances are that many users are unable to find a mouse that properly fits their hand or provides the optimum hand position at all times. In environments were multiple individuals use the same mouse, the chances of that mouse fitting each user's hand are further reduced.

Prior art mice are fixed in size and shape upon manufacture with the exception of the mouse described in U.S. Pat. No. 5,731,807 to Gary F. Felerbach, assigned to Sun Microsystems, Inc. Mountain View, Calif. This mouse is customizable for one specific user by providing a method for permanently fixing a shape after manufacture. It utilizes a pliable body that is set by a bonding agent activated by the user once the pliable portion of the mouse shaped to fit. The shape is then hardened and cannot be reconfigured. The computer mouse, as described in the Sun Microsystems patent, only allows partial shaping of the mouse body with the buttons and related based assembly remaining in a fixed orientation. Because only a part of it can be shaped, the Sun Microsystems mouse cannot conform to the unique shape of a user's entire hand. Another mouse that shows a pliable body is shown in U.S. Pat. No. 6,229,527 to Shearn. Both the Sun mouse and the Shearn mouse have a put the user's hand in direct contact with the moldable body skin that contains an moldable filler material. This offers an number of disadvantages including damage to the skin allowing leakage of filler material or bumps from the filler material and folds in the skin being uncomfortable. U.S. Pat. No. 6,040,539 to Hiegel shows a protective skin but this is only related to providing decorative or health benefits. The Hiegel skin has no structural value related to a moldable body.

A computer input device that could be quickly and easily reconfigured to comfortably position and properly fit the entire hand of a number of different users or, position and fit the same user's hand in more than one way, would provide a number of advantages. In addition, the same techniques that would allow a computer mouse to be reconfigured, could also allow creative shapes and appearances that provides some entertainment value that is not typical of computer mice.

SUMMARY OF THE INVENTION

The invention is a computer input device that has a body that can be adjusted at any particular time to provide a targeted ergonomic shape fit an individual user's hand and provide the desired hand orientation. The invention accomplishes this by having a structure that includes a flat base, a moldable core assembly, a positional button control module with a flexible range of movement, and padded covering, all enclosed within a flexible shell that gives the device structural integrity. The moldable core consists of a oversized sack that contains loose aggregate material mixed with a lubricant that ideally also has a slight adhesive quality. A vent is provided so that air can escape from the core's sack. The button controls are structurally separate from the flat bottomed base that contains the electronics and any mechanics that provide the required output to the computer. The buttons on the button control are elongated to allow a wide range of finger positions and have a unique internal lever system that provides easy and uniform actuation over the full length of the button. The controls are electronically connected by appropriate flexible means to the electronic components located on the base that transmit control activation signals. The input device communicates with the computer through direct wire connection, infra-red, wireless, or other means. The input device may include a layer of padding that is also enclosed in the flexible shell and integrated with the moldable core and the button control assembly to provide a smooth unified shape.

Having a computer input device with a shape that is easily configured to an individual's preferences, improves comfort and enhances control of mouse movement and interaction. The grips and hand positions available with an adjustable input device range from the horizontal orientation typical of most prior art devices to a more ergonomic vertical orientation. A specific range of shapes may be targeted with maximum ergonomic value that can supports the hand in a neutral position relative to the wrist and arm with a relaxed grip. However, even with increased comfort and superior control, a particular user may still experience some level of fatigue with continuous extended use. An adjustable input device can be reconfigured at any time to provide a change in hand position, providing relief from strain and fatigue associated with repetitive movements of the hand. Thus each user can find the most relaxed and natural position for their hand at any particular time, promoting maximum comfort and control.

Depending on design, an input device constructed with these techniques has the advantage of being able to include shapes not directly involved with the primary function of the computer input device. For example, using the proper exterior covering in texture and design with additional soft padding material, the computer input device could be made to resemble an animal. Other ornamentation could be added in areas of the device that do not interact or interfere with the user's grip or hand.

BRIEF DESCRIPTION OF THE DRAWINGS

FIG. 11 is an exploded top perspective view looking down from the left of the button control module of FIG. 9.

FIG. 11A is a fragmentary enlargement of the circled portion of the control module of FIG. 11.

FIG. 11B is enlargement of the circled portion of the dual-purpose lever arm of FIG. 11.

FIG. 12 is an exploded bottom perspective view looking up from the left of the button control module of FIG. 9.

FIG. 12A is a fragmentary enlargement of the circled portion of the button control of FIG. 12.

FIG. 12B is enlargement of the circled portion of the dual-purpose lever arm of FIG. 12.

FIG. 15 is an enlarged cross section of the side of button control module of FIG. 13 showing the an alternate arrangement with a lever and a separate guide limit arm.

FIG. 15A is an enlargement of the guide limit arm of FIG. 15.

FIG. 16 is an enlarged cross section of the side of button control module of FIG. 13 showing the an alternate arrangement with an switch mounted lever and a separate guide limit arm.

FIG. 17 is a top perspective view of the control module base of FIG. 11 and a bottom perspective view of the button control of FIG. 12 showing an alternate guide limit slot and tab arrangement.

FIG. 17A is a fragmentary enlargement of the circled portion of guide limit of FIG. 17.

DETAILED DESCRIPTION OF THE INVENTION

Figure 1:
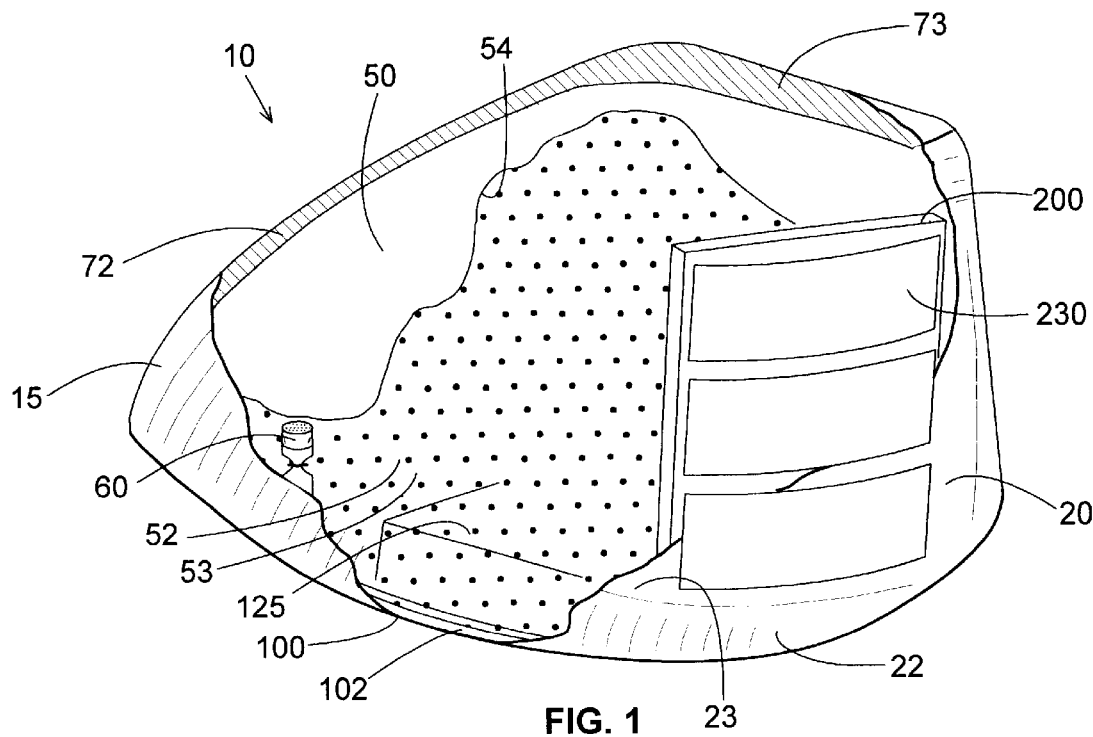
FIG. 1 is a perspective view of the right side of the adjustable computer mouse with a cutaway exposing the interior in accordance with a hi-profile embodiment of the invention.

FIG. 1 is a right side view with a cutaway exposing the interior components of a hi-profile configuration of the adjustable computer mouse 10, in accordance with one embodiment of the invention. The adjustable computer mouse 10 has a multi-component moldable core assembly 50 that consists of an oversized sack 54 containing loose aggregate materials 52, a core lubricant 53, and an air vent 60. The moldable core 50 sits on top of the base assembly 100 and sensor housing 125. A base sidewall support defines small finger support area 22. A plurality of structural padding 72 pieces consisting of various thickness and material is external to core assembly 50 and provides dimensional stability to the mouse shape. In certain areas structural padding 72 provides specific contours that partially form ring finger support 23. In other instances padding 72 consists of a thin layer that protects core sack 54 from other internal components and also serves to masks anomalies in the core. A top padding 73 assists in reshaping of adjustable computer mouse 10 and serves other functions as described below. A positional button control module 200 rests against padding 72 and moldable core 50. Depicted is a control module with three button controls 230. A structural flexible shell 15 encloses the core assembly 50 and padding 72 and 73. The flexible shell 15 attaches to control module 200 and base 100 to form a unified device structure formed by the confluence of the various components.

Figure 1A:
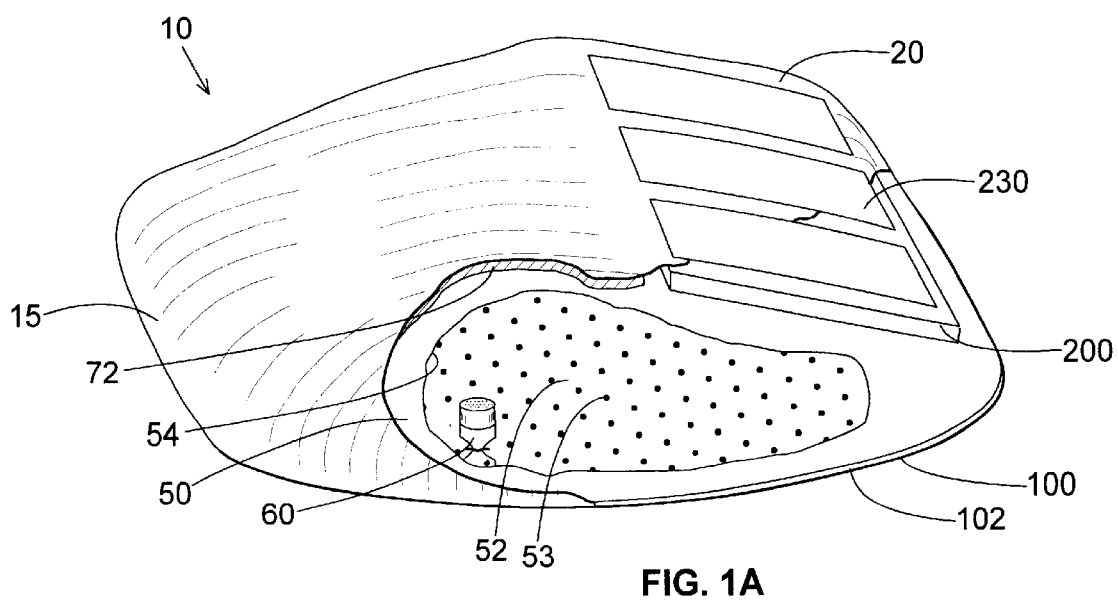
FIG. 1A is a perspective view of the right side of the adjustable computer mouse with a cutaway exposing the interior in accordance with a low-profile embodiment of the invention.

FIG. 1A is a right side view of a low-profile configuration of the adjustable computer mouse 10. The components are substantially the same as in the above preferred embodiment except for the surface area of flexible shell 15, the volume of core aggregate 52, and changes padding 72.

The structural padding 72 pieces and top padding 73 can consist of variety of natural and synthetic materials. Viable candidates include, loose polyester fill or batting, cotton fiber materials, or open cell foam rubber sheeting. Desired characteristics of the padding material are influenced by intended use of the padding. For example, for masking irregularities in core 50 from the aggregate material 52 causing a bumpy texture, or from folds or wrinkles in the core sack 54, open cell foam sheeting has the preferred characteristics of light weight, a very thin format, and planar flexibility. In order to hold padding 72 in place in certain areas, it may be desirable attach the padding to the surface of sack 54 or to the interior surface of shell 15 using adhesive or other methods. Blocks of padding 72 can also fill in gaps where there is no moldable core or other structure, thereby adding structure and shaping capabilities to any part of the mouse required. For these purposes loose polyester fill has certain preferred characteristics that include light weight and less than 100% shape memory. The use of padding 72 offers the advantage of a smooth contoured shape with a minimum of unwanted bumps in flexible shell 15, and a maximum response to hand shape.

As shown in FIG. 1, structural flexible shell 15 is not a surface covering but is the structural component that unifies the other components into a single integrated device. The flexible shell 15 can consist of any number of synthetic or natural materials. It is also possible to employ different materials for different portions of the shell. A light weight 94% polyester, 6% spandex, knit fabric has the ideal qualities of high planar flexibility and a moderate ability to stretch in certain directions. This allows it to follow the shape of the core with minimum resistance. Further advantages and importance of these characteristics will become apparent as disclosed in FIGS. 4, 20, and 21 as discussed below. Other categories of suitable materials include, but are not limited to; leather, woven synthetic or natural fabrics, rubber or latex, plastic sheeting, natural knit fabrics, special texture fabrics such as simulated fur, or combination material fabrics. An example of a combination material is a polyester knit material with an approximately 1 mm thick foam backing, commonly used as automobile headliner material. This type of material has the advantage of combining the padding 72 and the flexible shell 15 into one component. However, it tends to be more resistant to shaping than the polyester/spandex knit material.

Figure 2:
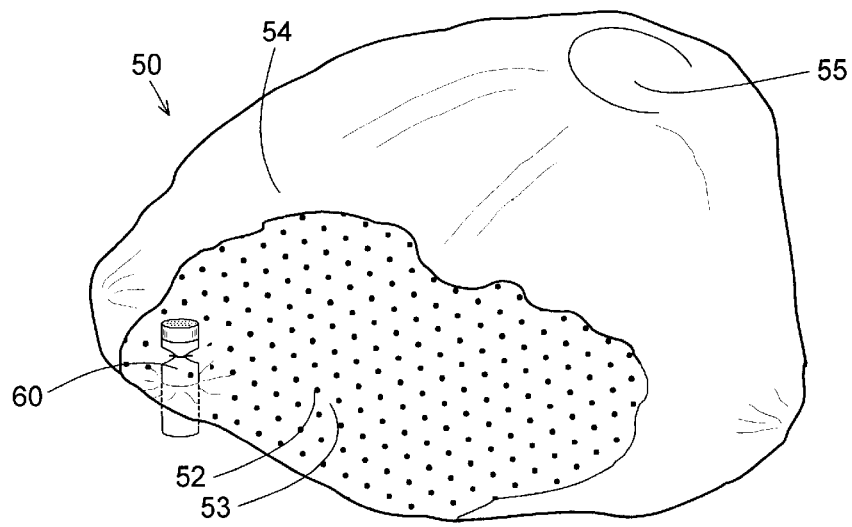
FIG. 2 is a perspective view with a cutaway exposing the interior of the moldable core of the adjustable computer mouse of FIG. 1.

As shown in FIG. 2, moldable core assembly 50 consists of an oversized sack 54 encapsulating loose aggregate material 52 and a lubricant substance 53. Depending on the requirements for a lubricant, a non-porous material such as low density polyethylene or polyvinyl based sheeting of approximately 0.5 MIL to 1.5 MIL thickness is suitable. Other materials with similar qualities to low density polyethylene or polyvinyl may be used. These qualities include being non-porous so the lubricant 53 does not leak, having low planar shape retention memory, not making unwanted 'rustling' noise when re-shaped, and consistent operation at various temperatures. A non-porous fabric, such as specially treated nylon, that is sufficiently pliant may also be employed. Non-porous elastomer materials, such as rubber or latex, can be utilized for core sack 54 but offer certain disadvantages. Elastomer materials usually have shape memory and tend to stretch across contours in the contained aggregate thereby masking the desired shape. Elastomers also tend to have surface that is less slick, which can 'snag' against other components when re-shaping. Materials such as Metalized plastic sheeting and metallic layer plastic sheeting tend to have too much shape retention and are noisy. A polyvinyl material of approximately 0.75 MIL thick has the preferred characteristics of maximum deformation with minimum noise, minimum shape memory, and minimal gas osmosis.

Core sack 54 should be of size and shape relative to the target device with a substantial allowance for excess surface area beyond the minimum required to encapsulate the volume of aggregate 52. Initially, the overage of sack material provides additional surface area that is required for the core to accommodate the shape of other components. During use, the extra sack material provides additional surface area to follow the contours as shaped for a user's hand. More than one sack or a compartmentalized sack may be utilized to form the core assembly in order to promote a certain functional shape, however the preferred embodiment utilizes a single sack 54.

Aggregate material 52 can consist of any number of synthetic or natural materials. The aggregate can consists of a single material or a combination of materials. It is desirable that a material is light weight in order to keep the overall weight of core assembly 50 to a minimum. In one example, the aggregate consists of Styrofoam balls of approximately between 1 mm and 3 mm in diameter. Other materials of note are open cell foam rubber, closed cell poly foam, poly fill, cotton, silicone, air filled plastic bubbles, polypropylene beads, or any other suitable material. Depending on the material, it can be loose fill or pieces or come in balls approximately between 0.25 mm and 3 mm in diameter. The 1 mm to 3 mm Styrofoam balls have many of the characteristics of the ideal material in terms of providing for easy deformation of the core shape, being light in weight, and virtually unaffected by temperature or humidity.

A lubricant substance 53, for example a liquid soap, enhances the formability an aggregate material 52 consisting of Styrofoam balls. A lubricant such as liquid soap, also provides a mild adhesive quality that enhances shape retention. The lubricant can consist of any number of, or combination of, substances including, but not limited to: natural, synthetic, or petroleum based liquid oils; natural, synthetic, or petroleum based gels; or dry materials such as graphite powder. Not all aggregate materials benefit from or require a lubricant and certain combinations of aggregate and lubricant may not be desirable. For example, a petroleum based lubricant may cause deterioration of a Styrofoam ball aggregate.

As shown in FIG. 2, a filler flap 55 is located at the top of sack 54. Alternatively, filler flap 55 can be located on the bottom of the core sack or wherever it does not interface with the structure and shaping of adjustable computer mouse 10. Filler flap 55 allows addition of or removal of aggregate 52 and lubricant 53 during the manufacturing process. Any number of methods may be employed to seal the flap including zipper, glue, and or heat.

Figure 3:
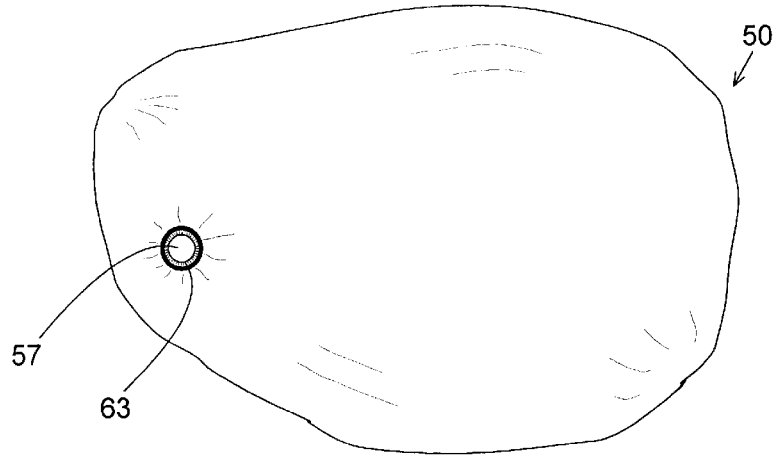
FIG. 3 is a bottom view of the moldable core of FIG. 2.

FIGS. 2 and 3 show an air vent assembly 60 that penetrates the core sack 54 in order to allow removal or addition of air from core 50. The importance of air flow to the invention will become apparent in discussions below. Although shown on the bottom in this example, it can be located anywhere, preferably in an area where it does not interfere with the function or appearance of the mouse. The external end 63 of vent tube 62 should be placed where it is accessible during assembly of adjustable computer mouse 10, the advantages of which become apparent below. Alternative means of providing air flow include utilizing micro perforated material for core sack 54. However, micro perforations may weaken the sack and allow leakage of lubricant 53. The preferred core assembly of FIG. 2 with an air tube is generally superior for most purposes.

Figure 4:
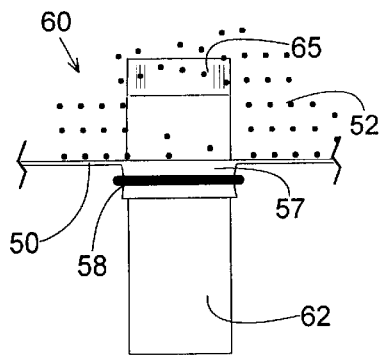
FIG. 4 is an enlarged plan view of the side of air vent assembly of the invention.

As shown in FIG. 4, an enlarged plan view of the side of vent assembly 60, vent tube 62 is of sufficient length for a section to penetrates into the moldable core and provide an external section. Vent tube 62 consists mainly of a hollow tube of approximately 3 mm to 5 mm in diameter. Polyvinyl tubing commonly referred to as surgical tubing with a wall thickness of approximately 0.5 mm, plus or minus 0.25 mm, has the ideal characteristics of strength, flexibility, and shape retention. Other substances may be used for the tubing including composite and layered natural or synthetic materials.

Figure 5:
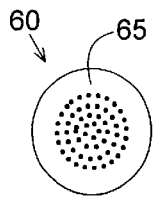
FIG. 5 is a top view of the top of the air vent assembly of FIG. 4.

A vent filter 65 is located at the end of the tube 62 internal to the core. The filter prevents the aggregate material 52 from going into or clogging the air tube. Vent filter 65 may be constructed in any number of manners using various materials including breathable fabric or open cell foam rubber and may attached to the tubing using any number of secure means. As shown in FIG. 5, the filter holes must be of sufficient size to allow free air flow, but small enough to block aggregate material.

Figure 4A:
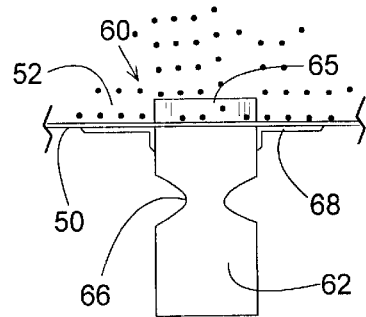
FIG. 4A is an enlarged plan view of a second embodiment air vent assembly of FIG. 4.

Vent tube 62 is attached to core sack 50 by attachment band 58 that attaches vent opening flap 57 to the tubing. Attachment band 58 can utilize any number of well known methods used to attach hosing, seal open ends of bags, or tie cables. An alternative method of attaching the tubing to the sack material using a separate glued on or heat welded vent mount 68 is shown in FIG. 4A. Any other suitable method of attachment may be utilized.

Also shown FIG. 4A, optionally a bi-directional flow restrictor 66 is formed by permanently flattening an area of the tubing. This reduces the flow of air into and out of the core 50. Any number of industry standard check valves could be used, however they would restrict the flow of air in one direction. The advantage of reduced air flow is discussed below.

The volume of air inside of the moldable core is critical to the proper level of pliability of core assembly 50. Too high a volume of air makes aggregate material 52 too loose and can also form air pockets. This makes the core too pliable and unable to properly support a user's hand or adequately support control structures. Additionally, the core is not able to remain conformed to a user's hand shape and unintentional reshaping of the core from ordinary use occurs. Such excess air can slowly leak into core sack 54 by gas osmosis, through pinholes or flaws in the seams of the sack, or changes in altitude. Vent assembly 60 enables rapid expulsion of this extra unwanted air. Too low a relative volume of air makes aggregate material 52 overly tight, in effect vacuum packing the moldable core into a tight mass so it is no longer pliable. Vent assembly 60 prevents this from occurring.

Figure 20:
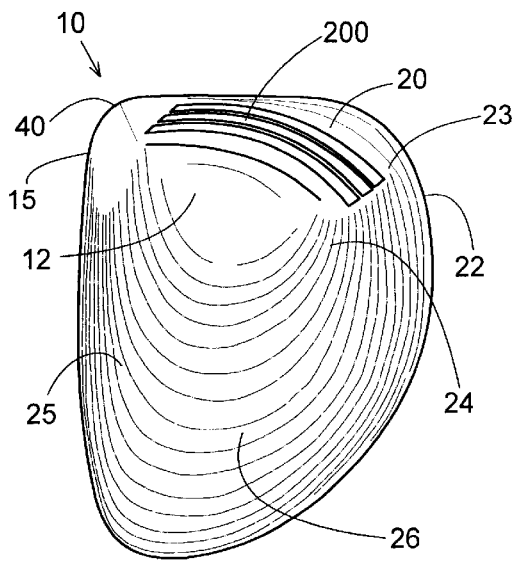
FIG. 20 is a top view of the adjustable computer mouse of FIG. 1 showing an initial minimally contoured shape.
Figure 21:
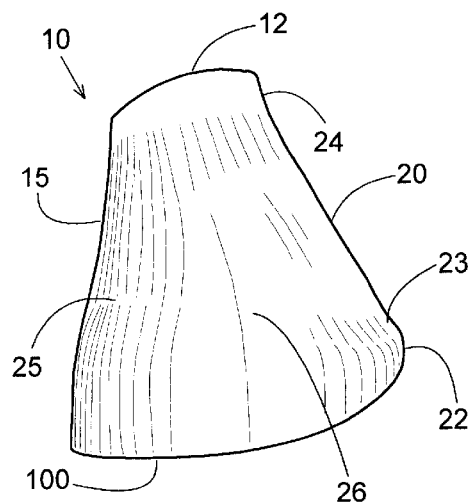
FIG. 21 is a rear view of the adjustable computer mouse of FIG. 1 showing an initial minimally contoured shape.

During ordinary the desired balance in relative air volume in the core assembly 50, is maintained by the properly tensioning the flexible shell 15. A tight or tensioned shell 15 places constant external pressure on the core, keeping extra air out. FIGS. 20 and 21 and the discussions below further illustrate the interrelationship between direction and degree of flexible shell tensioning and maintaining the desired moldable characteristics.

Figure 6:
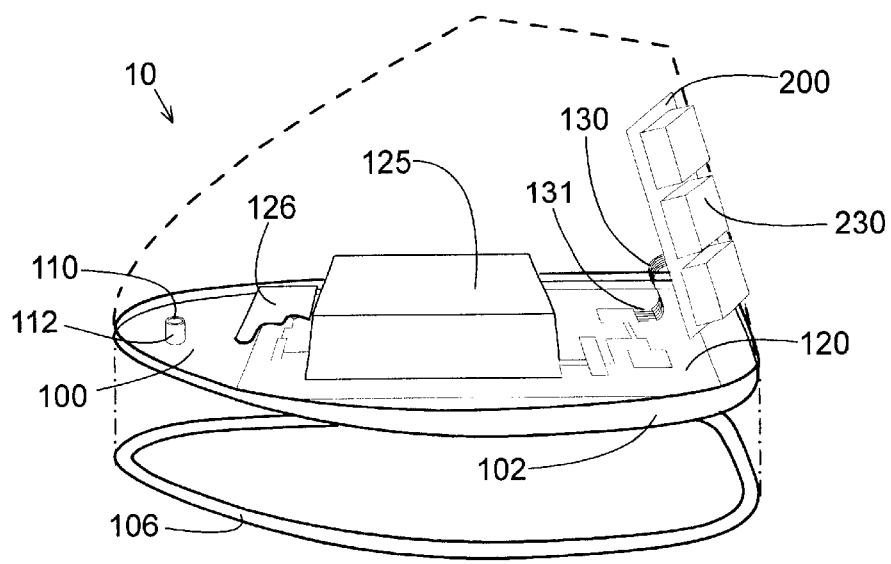
FIG. 6 is a side view showing the base components of the adjustable computer mouse of FIG. 1.
Figure 7:
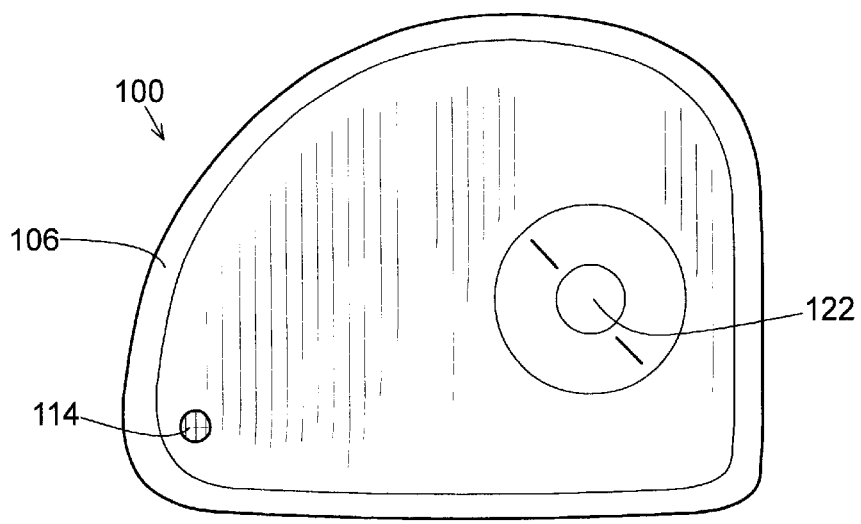
FIG. 7 is a bottom view of the base components of FIG. 6.

In FIGS. 6 and 7, a vent hole 110 is shown on base 100. When adjustable computer mouse 10 is assembled, the external end 63 of vent tube 62 is inserted into vent sleeve 110. A vent screen 114 in base 100 prevents dust or contaminates from entering or blocking vent hole 110. During assembly of the adjustable computer mouse 10, a tightly packed core is an advantage. After conforming core assembly 50 to the other components, a hose from a vacuum pump may be inserted into vent hole 110 to extract air from the core and reduce it to a smaller volume and a relatively non-pliable form. This process makes it easier to assemble and tension flexible shell 15 around the core and other components. Flow restrictor 66 further assists assembly by not allowing air to re-fill the core too quickly when the vacuum pump is no longer attached to the mouse.

Figure 8:
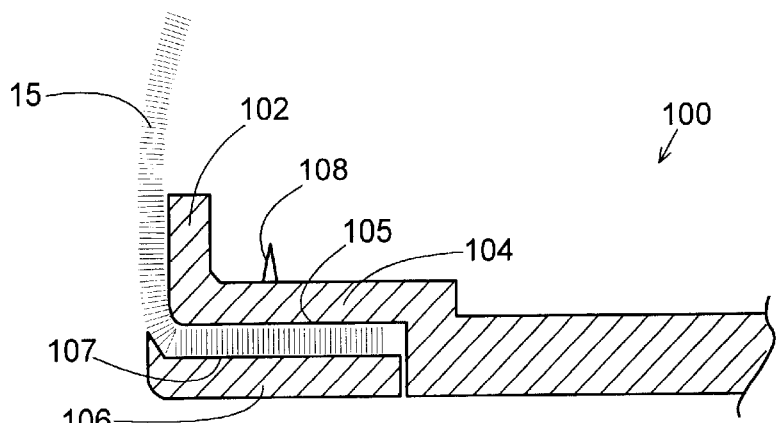
FIG. 8 is an enlarged cross sectional view showing the attachment of a flexible shell to the base components of FIG. 6.

As shown in FIG. 8, the shell 15 material is attached to base 100 to notch surface 105 of base notch 104. Attachment means may consist of glue, adhesive, mechanical fasteners, sewing, or any other secure method. Since shell 15 is under tension, the material is wrapped around base sidewall 102 into shell notch 104 so the attachment is not under direct strain. This arrangement has the advantages of helping prevent attachment failure and/or resulting degradation of shell material integrity. Additionally, the attachment edge of the shell material may be uneven and rough. FIGS. 7 and 8 show a shell retainer 106 which covers the uneven edge of the shell material. This creates a clean appearance and a smooth base bottom for unimpeded movement of the mouse over a flat surface. Shell retainer 106 is attached to notch 104 using any number of mechanical means including screws or snap-tabs. Additionally, shell retainer surface 107 may be secured to shell material by any one of several methods in order to strengthen the overall attachment of the shell 15 to the base 100.

The other components that the core 50 conforms to are shown in FIG. 6 where base assembly 100 consists of a flat base and the electronics and mechanics that provide the required input signals to the computer. An electronics protector backing 126 is shown that provides a barrier to prevent interference with the base circuit board electronics 120 by the core assembly 50 and damage to the core sack 54 by electronic components. Backing 126 may be made from any number of materials including a thin closed cell foam sheeting. Backing may also be used wherever required such as on the back of control mode 200. Sensor housing 125 protects the sensor electronics and mechanics of the mouse 10 from interference by core assembly 50. Sensor housing 125 can be formed in any shape required. It can be made of a variety of materials, preferably a rigid plastic. Ideally the housing is an integrated component of the base assembly.

In FIG. 6 a control module 200 with three button controls 230 is depicted. However, any button or control configuration may be substituted, including a wheel or a track ball. Buttons or controls can be integrated as a single unified assembly as shown, or consist of a plurality of modules. Buttons or controls may also be located in other areas of the mouse, for example a button may be positioned for activation by the user's thumb. The positional control module 200 is not directly connected to the base 100 in a fixed position. Ideally, the only connection of control module 200 to the base is a module wiring harness 130 that transmits required signals from the control module 200 to the base electronics 120. Harness 130 is connected to base electronics 120 by harness connector 131 consisting of an industry standard connector well known in the art. Module harness 130 must be the proper length and be flexible enough to provide the required range in movement of the control module 200 to accommodate shaping the adjustable computer mouse 100 to the a user's hand.

Figure 9:
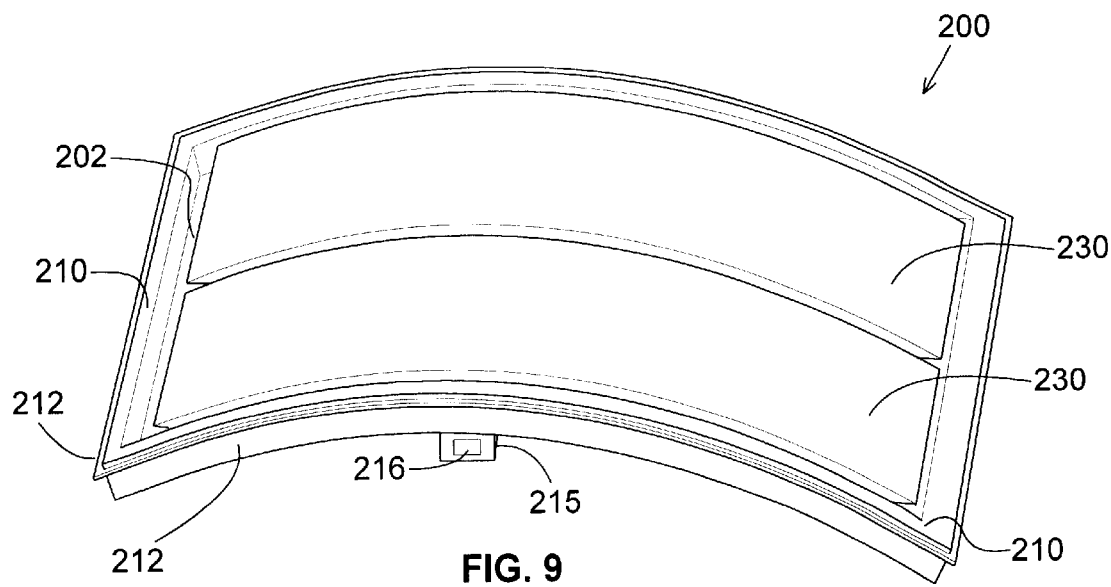
FIG. 9 is a view looking down at the top-left side of a two button control module of the base components of FIG. 6.
Figure 13:
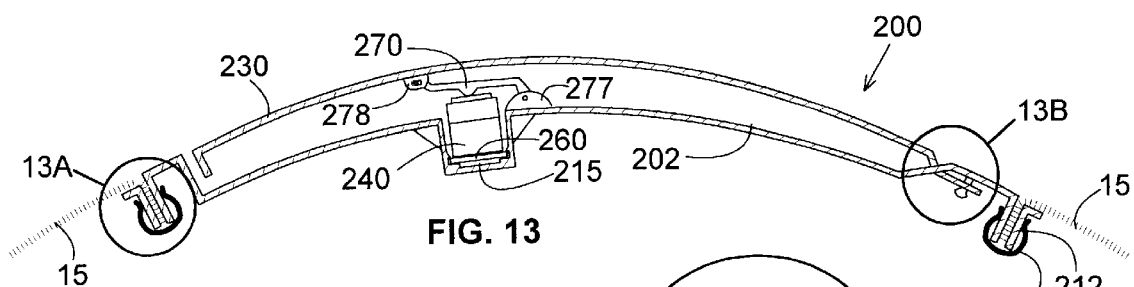
FIG. 13 is an enlarged cross sectional end view of the button control module of FIG. 9 showing the button control, dual-purpose lever arm, and flexible shell attachment.
Figure 13A:
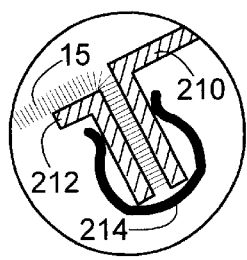
FIG. 13A is a fragmentary enlargement of the circled portion of the button control module of FIG. 13 shell attachment detail.

FIG. 9 shows the top left side of a control module 200 with two buttons controls 230. Button controls 230 are formed from a rigid fixed-shape material, preferably a polymer based plastic. Underlying the buttons is a rigid fixed-shape module base 202 that also extends up along the sides of the buttons to form a mounting channel 210. Module base 202 and other related components are also formed from a polymer based plastic. A module mounting retainer 212 extends along the sides, front, and back of module base 202. Further details regarding the use of module retainer 212 and module mounting channel 210 are shown in FIGS. 13 and 13A and the discussion that follows.

Figure 10:
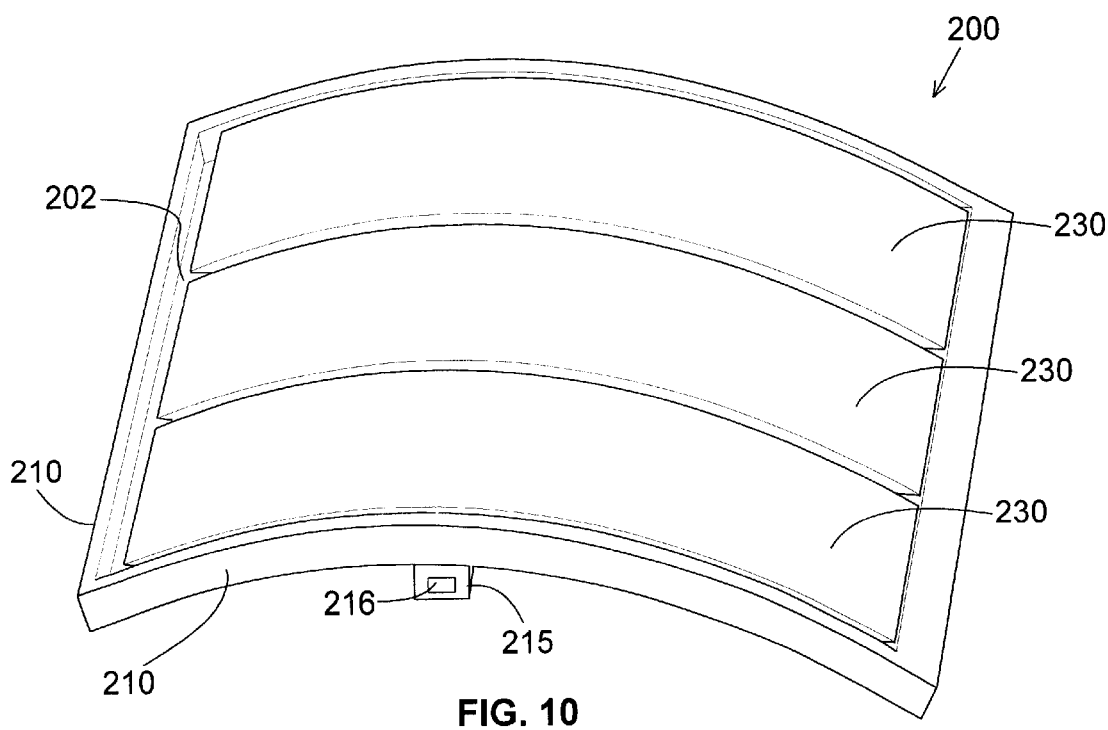
FIG. 10 is a view looking down at the top-left side of a three button version of button control module of FIG. 9.

FIG. 10 illustrates that the control module 200 can accommodate any number of buttons or controls by showing the top left side of an example with three buttons controls 230. FIG. 10 does not include module retainer 212 in order to better show mounting channel 210.

FIG. 11, an exploded top perspective view looking down from the left of a two button version of button control module 200, shows that underneath button control 230 a momentary switch 240 is mounted on switch circuit board 260 which snaps into or is attached by other means to base switch channel 215. At the end of printed circuit board 260 is switch connector 262. A module connector opening 216 is located at both ends of base switch channel 215. Printed circuit board 260 can be rotated 180° to place switch connector 262 closest to the desired connector opening 216 in order to connect to module harness 131.

Figure 14A:
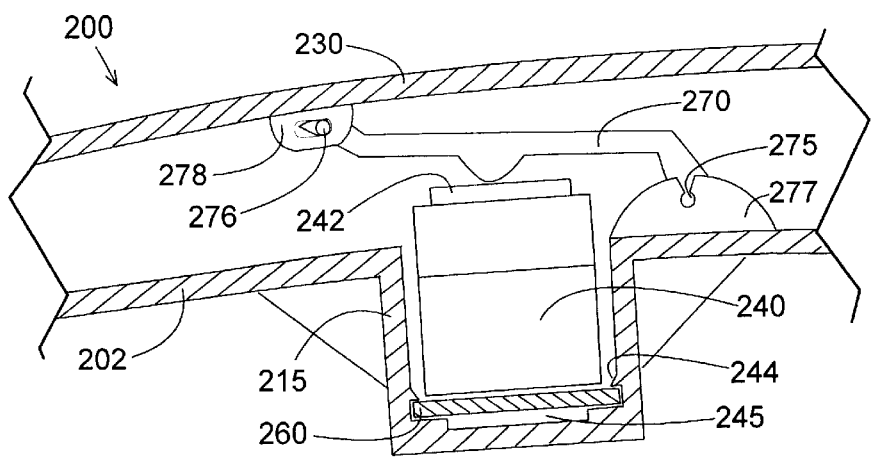
FIG. 14A is an enlarged cross section of the side of button control module of FIG. 13 showing the detail of the dual-purpose lever arm and momentary switch.
Figure 14B:
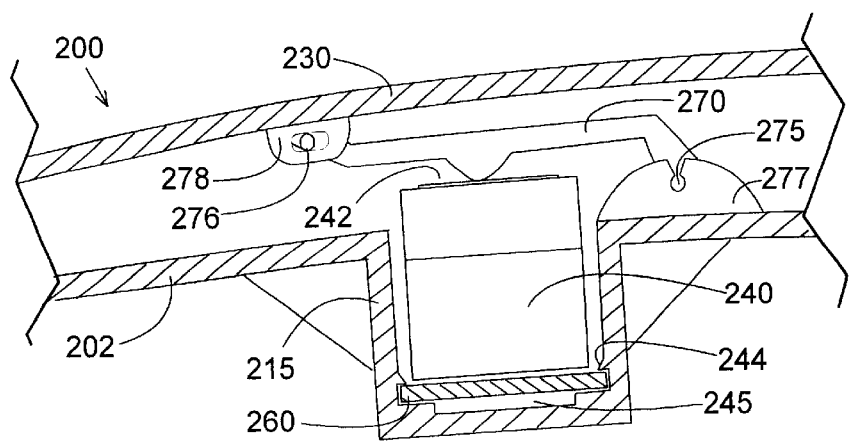
FIG. 14B is an enlarged cross section of the side of button control module of FIG. 13 showing the dual-purpose lever arm and momentary switch in the activated position.

Module components include a dual-purpose lever arm 270 that serves to actuate momentary switch 240 and also to limit and guide movement of button control 230. Dual-purpose lever 270 connects to base fulcrum 277 which is formed by projections from module base 202. As shown in FIG. 11B, an enlarged view of the circled area of the dual-purpose lever 270, a lever fulcrum shaft 275 is formed by cylindrical projections from the fulcrum end of the lever arm. The lever fulcrum shaft 275 snaps into the base fulcrum 277 shown in FIG. 11A, an enlarged view of the circled area of base 202. FIG. 12, an exploded bottom perspective view looking up from the left of button control module 200, shows a travel limit guide 278 consisting of a slotted channel formed by projections from the underside of button control 230. As shown in FIG. 12B, an enlarged view of the circled area of the effort end of dual-purpose lever 270, there is a travel limit shaft 276. The limit shaft 276 fits into the slot of limit guide 278, as shown in FIG. 12A, an enlarged view of the circled area of button 230. The advantages of this unique arrangement of a dual-purpose lever are shown in FIGS. 14A and 14B and the discussion that follows.

Figure 13B:
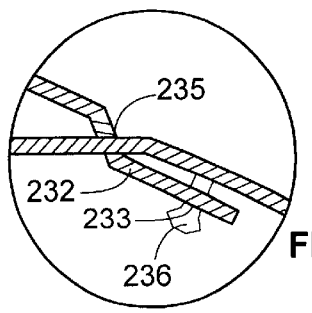
FIG. 13B is a fragmentary enlargement of the circled portion of the button control module of FIG. 13 showing hinge detail.

As shown in FIG. 12, button control 230 has a button hinge tab 232. A button hinge slot 233 is located in button hinge tab 232. Button hinge tab 232 fits through base hinge slot 235 located on the module base. On either side of base hinge slot 235 are base hinge retainers 239 formed by projections from the underside of module base 202. Hinge retainers 239 help keep button hinge tab 232 in alignment. A hinge cover 238 fits over hinge retainers 239 to protect the hinge from interference with other components. FIG. 13, a cross section of the components of control module 200, shows the button hinge arrangement in assembled form. As shown in FIG. 13B, an enlargement of the hinge arrangement, button hinge slot 233 fits over hinge snap-tab 236, securing button control 230 to module base 202.

FIG. 13 shows control 200 module attached to flexible shell 15. As shown in FIG. 13A, an enlargement of the circled module attachment, the shell material is sandwiched between mounting retainer 212 and module channel 210. Mounting retainer 212 and module channel 210 are held together by a U-clamp 214 of sufficient strength to account for any pulling tension on shell 15. In addition to a U-clamp, any number of mechanical means including screws, snap-tabs, or a snap-retainer shape may be used to secure the retainer to the channel. The further secure the control module 200 to the shell 15, the shell material may also be attached to the surfaces of mounting retainer 212 and module channel 210 by any number of means including glue, adhesive, mechanical fasteners, sewing, or any other secure method. This strength of this attachment is multiplied because it is not under direct strain due to the wrapping of the shell material across mounting retainer 212. This arrangement has the additional advantage of placing the cut edge of the shell material to the interior of the structure creating a clean joint between the shell 15 and the control module 200.

Further advantages of that control module 200 offer are related to the length and curvature of button control 230 and the uniform activation effort resulting from the double lever arrangement provided by the addition of dual-purpose lever 270. FIGS. 14A and 14B, enlarged cross sections of the switch area of control module 200, illustrate a button in the up, deactivated, position and in the down, or activated position. FIG. 14A shows a button in the up position with dual-purpose lever 270 resting on a switch plunger 242 which is kept in the up position by an internal leaf spring contact well known in the art of momentary switches. FIG. 14B shows how button control 230 acts as a lever which interacts with other components to activate the switch. When a user's finger depresses button control 230, it pivots on its fulcrum (the button hinge arrangement shown in FIG. 13B) so that button control 230 depresses switch lever 270. This moves the free end of switch lever 230 toward momentary switch 240 by pivoting switch lever 270 so that it depresses switch plunger 242 and activates the switch. Essentially, this arrangement utilizes a second-class internal lever which receives its effort from a button acting also as a second-class lever. The advantages of this double lever arrangement become apparent when compared to the typical prior art.

In a typical prior art button switch arrangement, button control 230 actuates the momentary switch in a direct fashion, without the assistance of a second internal lever. Button control 230 behaves essentially as a third-class lever that requires a wide variance in effort on different parts of the buttons in order to cause activation. For example, minimum effort is required to activate the button control 230 when pressure is applied on the end of the button over or near the switch mechanism. However, when pressure is applied nearer to the fulcrum of the button (the hinge arrangement shown in FIG. 13B), greater effort is required to depress the button and actuate the momentary switch. Most prior art buttons are generally flat in shape and are considerably shorter than those of the invention. Button controls 230 of the invention, typically ranging from 45 mm to 75 mm in length, are longer and also have a curved shape. The greater length increases the effort necessary to activate the button at its hinge area. The curve can also increase the pressure required to activate the button. For example, on a curved button control 230, effort exerted near its fulcrum is at an angle to the direction of pivot and loses a certain amount of force. The invention's double lever system compensates for a longer curved button control 230, allowing a finger placed near the button's fulcrum to use far less effort to activate the button when compared to shorter flat prior art buttons without the second lever. At the same time, the lever system does not make the button overly sensitive, causing inadvertent activation. The advantages of using a double lever mechanism is a more uniform level of an ideal activation effort over the entire length of button control 230.

FIGS. 14A and 14B also illustrate the second purpose of dual-purpose lever 277. Dual-purpose lever 277 acts in conjunction with limit guide 278 to connect button control 230 to module base 202, holding button control 230 down in position and limiting unwanted lateral and torsion movements. This arrangement is required because the button hinge arrangement shown in FIG. 13B is not sufficient to keep button control 230 in proper alignment when subject to lateral or off center pressure from a finger or to keep button control 230 from rotating past the usual up position breaking the unified curvilinear plane formed by the shell 15 and the control module 200. As shown in FIG. 14A, travel limit shaft 276 is at the end of the slot of limit guide 278, preventing further upward pivot of button control 230. FIG. 14B shows that travel limit shaft 276 moves down the slot of limit guide 278 when the button is activated.

Uniform ease of activation are not limited to the exact configuration of the dual lever arrangement shown in FIG. 13. It is only one example out of many possibilities. Without affecting the underlying improvement of using a double lever mechanism, many changes can be made such as the location and orientation of base switch channel 215, the type of momentary switch 240, the exact length and curvature of button control 230, and the length and shape of dual-purpose lever 270. Alternates may also include splitting off the travel limit functionality from the dual-purpose lever 270 to other arrangements.

As shown in FIG. 15, an enlarged cross sectional end view of a button control 230 and related switch components, there is the addition of a button back protector 273 which rests on a simplified switch lever 272. Button back protector 273 may be attached using additional means such as adhesive or glue or snap into a plurality of tabs. Switch lever 272 performs the same lever function as the dual-purpose lever 270 shown in FIG. 13. However, in this arrangement the invention uses a separate arm member to keep button control 230 in proper alignment along its length and limit its pivot travel on the hinge axis. FIG. 15A, an enlarged view of a guide limit arm 280, shows that it has cylindrical projections that form shafts at both its ends. The shaft at one end of guide limit arm 280 fits into a slot in a button guide retainer 283 that consists of a channel formed by projections from button control 230. The shaft at the other end fits into a base guide limit 282 that consists of projections from module base 202. This arrangement serves to connect button control 230 to module base 202, and hold button control 230 in position in similar fashion as does the dual-purpose lever arrangement. Base guide limit 282 hinges one end of guide limit arm 280 so it can rotate as required for its other end to travel within the slot of button guide limit 283. The slot of button guide retainer 283 limits the travel of guide retainer arm 280 which in turn limits the pivot of button control 230 to the desired range of rotation.

FIG. 16, an enlarged cross sectional end view of a button control 230 and related switch component shows a switch lever 272 attached to the momentary switch 240. As in the prior arrangements, switch lever 272 is a second-class lever except that its fulcrum end is formed to fit into the built-in slot of the industry-standard momentary switch 240. As shown, switch lever 272 of the invention has been modified from the typical straight metal lever well known in the art, to instead have a custom curved shape that is trimmed to a predetermined length. Not shown is an available industry standard switch lever 272 that has a roller on the end. Note that the switch 240 of FIG. 16 has been turned 90° so the switch is in parallel alignment with the button. Turning the switch in this direction would allow for a narrower button if so desired.

Figure 18:
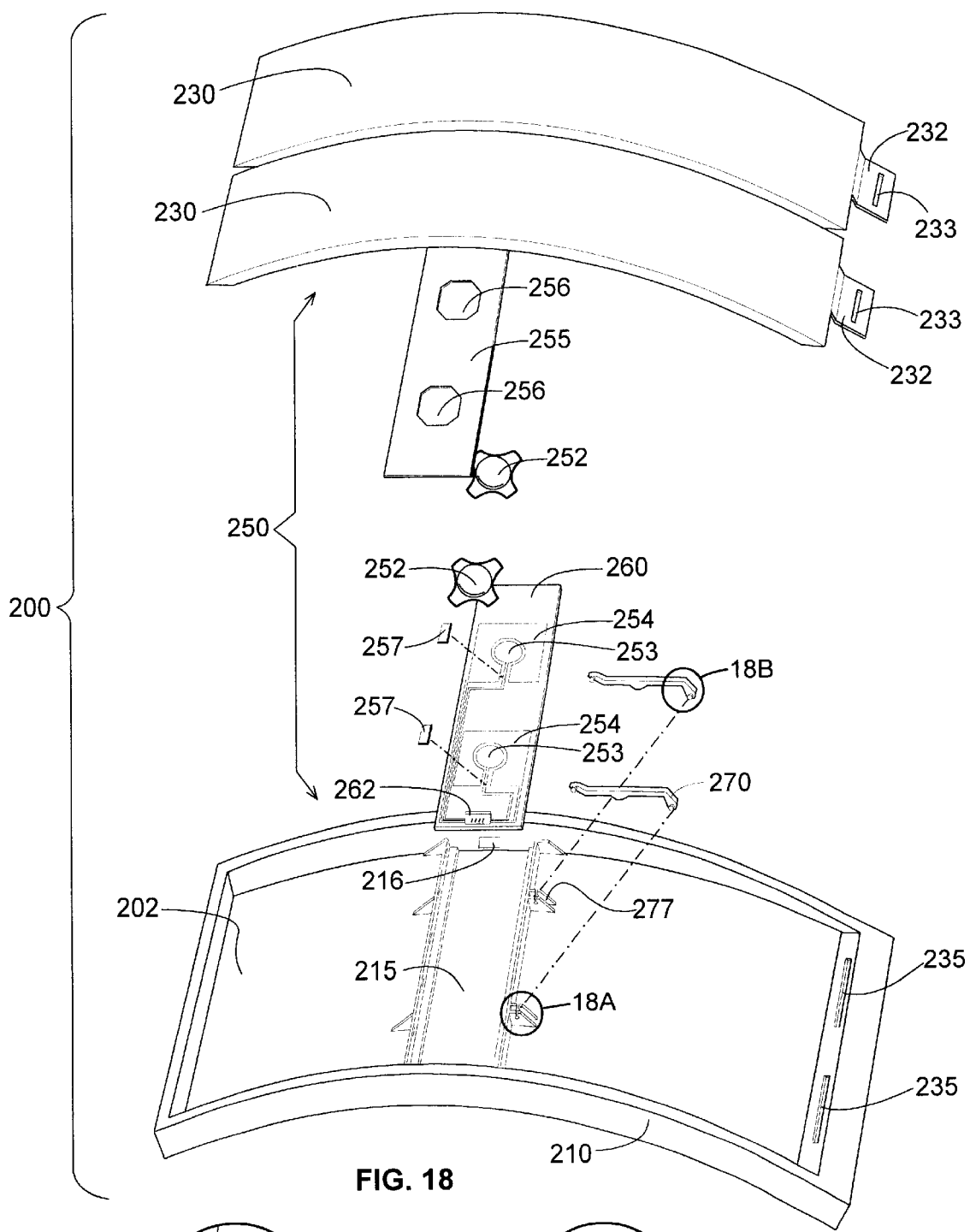
FIG. 18 is an exploded top perspective view looking down from the left of the button control module of FIG. 9 with an alternate dome contact switch assembly.
Figure 18A:
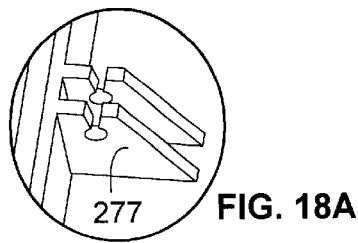
FIG. 18A is a fragmentary enlargement of the circled portion of the control module of FIG. 18.
Figure 18B:
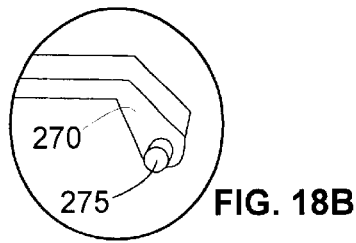
FIG. 18B is enlargement of the circled portion of the dual-purpose lever arm of FIG. 18.
Figure 19A:
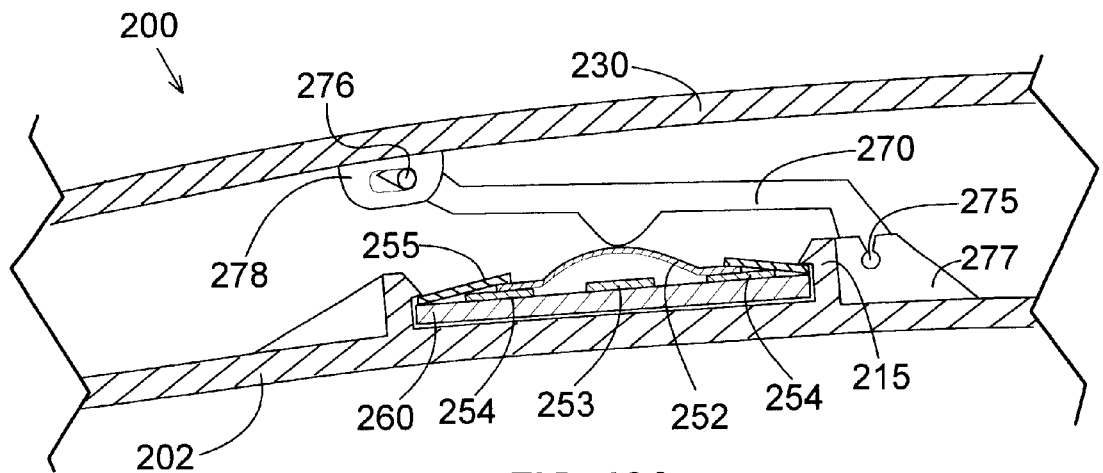
FIG. 19A is an enlarged cross section of the side of button control module of FIG. 18 showing the detail of the dual-purpose lever arm and dome contact switch.
Figure 19B:
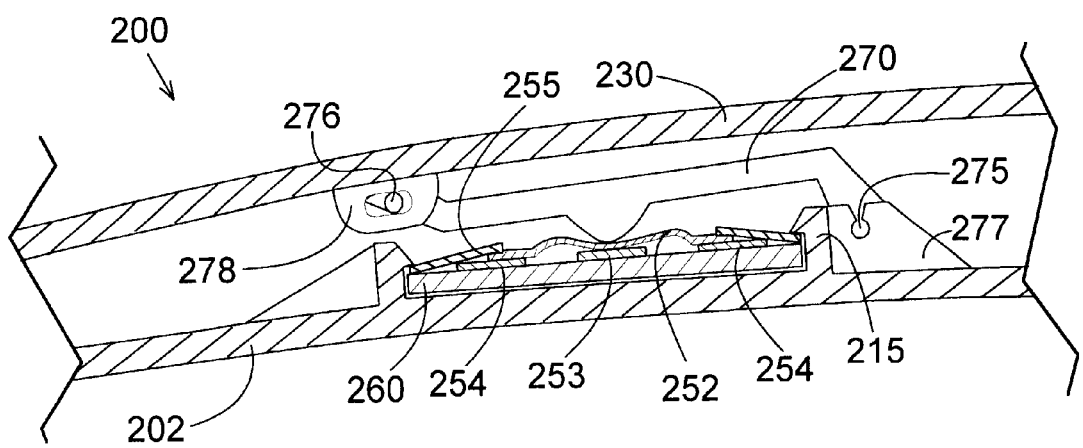
FIG. 19B is an enlarged cross section of the side of button control module of FIG. 18 showing the dual-purpose lever arm and dome contact switch in the activated position.

Another example of alternate switch design is shown in FIG. 18, an exploded top perspective view looking down from the left of an embodiment of button control module 200 that utilizes a dome switch assembly 250. As shown by FIG. 19A, an enlarged cross section of control module 200 with the alternate dome contact assembly 250, this embodiment has the advantage of a slimmer profile and a smooth back. When compared to the module of FIGS. 13, 14A, and 14B, the module of FIG. 19A has a base switch channel 215 that does not protrude from the back of module base 202 and its button control 230 is closer to module base 202. This is accomplished by using a standard metal dome contact as manufactured by Snaptron, Inc. that typically consists of a resilient stainless steel and is well known in the art of membrane style switches. The dome contact acts as a spring that when pressure is applied to its center, snaps into a flattened shape, and when released pops back into its original dome shape. When activated, as shown in FIG. 19B a special bulge on dual-purpose lever 270, depresses metal dome 252 and completes the switch circuit present on printed circuit board 260. FIG. 18 shows that printed circuit board 260 has one side of a circuit with a feet contact 254 which is an enlarged rectangular section of conductive silver ink which contacts the feet of the dome switch. The other leg of the conductive silver ink circuit ends with a dome contact 253 which is a circular area of conductive ink that corresponding to the location of the center of the dome contact. A flexible plastic switch circuit insulator 257 is adhered to the section of dome circuit immediately outside of the contact circle to prevent the dome feet from contacting it. When in the actuated flattened position, the dome 252 contacts contact 253 and completes the circuit, acting as a momentary switch. The dome 252 is held in place by a dome retainer layer 255 consisting of an insulative semi-rigid plastic and is attached to printed circuit board 260 with adhesive, glue, or other suitable means. Dome retainer layer 255 has a dome opening 256 that allows the dome 252 to protrude through the layer while holding its feet in contact with printed circuit board 260. A series of spacer ridges protruding from the bottom of dome retainer layer 255 can be, used to keep dome 252 in alignment.

Ordinarily the effort required to activate a dome style switch can be a source of fatigue after repetitive use. However, the special shape of and the leverage supplied by dual-purpose lever 270, work together to reduce the effort to a ideal level. Because of this the dome style switch is a viable alternative which delivers the advantage of low profile and smooth module back 202 that does not interfere with the core shape or core sack 54.

Whether in the preferred embodiment of FIGS. 11, 12, and 13 or an alternate arrangement the invention's control module 200 delivers a number of unique advances. This horizontal orientation of most prior art mice is required because the buttons actuate switches located on base electronics 120 at the mouse base 100. By placing the buttons, switches, and related mechanisms in a separate button control module 200, the invention allows placement of the buttons to be independent of base electronics 120. This allows the buttons to be placed in a more vertical alignment to fit the adjustable computer mouse 10 as shown in FIG. 20, a top view of a hi-profile configuration prior to adjusting the shape for an individual. The contour lines indicate a nominal shape for a right handed individual. On the left side of adjustable computer mouse 10 is thumb cradle surface 25. The back of the mouse has a curved palm support surface 26. On the right side is the small finger support 22 and ring finger support 23. A control area 20 curves across the front of the mouse. The rear view of the invention in FIG. 21 shows a wide base 100 with relatively straight sides that taper up to a narrower top 12.

Figure 20A:
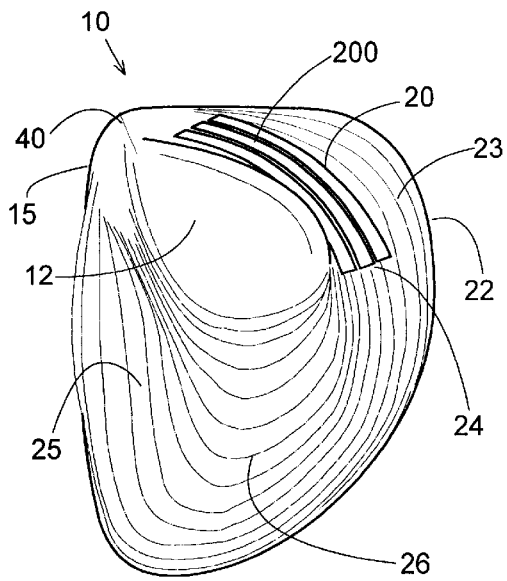
FIG. 20A is a top view of the adjustable computer mouse of FIG. 1 after being adjusted to provide support for a specific hand.
Figure 21A:
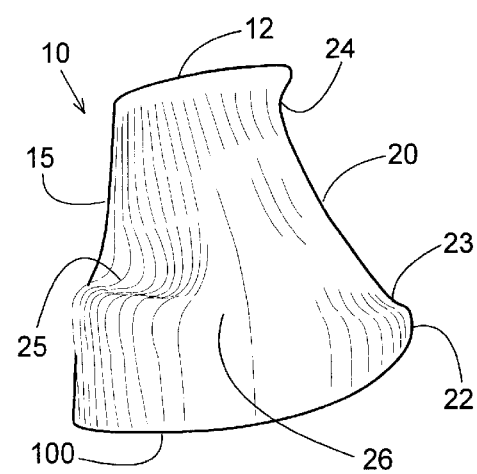
FIG. 21A is a rear view of the adjustable computer mouse of FIG. 1 after being adjusted to provide support for a specific hand.

FIG. 20A is a top view of a hi-profile adjustable computer mouse 10 after a user has manipulated the mouse shape. To adjust the shape of the mouse, a user squeezes the mouse with a reasonably firm grasp. This causes the aggregate material 52 in the core assembly 50 to displace accordingly. The flexible shell 15 and control module 200 to displace accordingly. In order to get the desired orientation and angle of control area 20, deliberate pressure may be applied to control area 20 to reshape the portion of the core that supports the control module 200. During this process control buttons can be inadvertently activated. To prevent this, an on-off button could be added to the mouse or special software that captures any mouse clicks sent to the computer could be run. As shown in FIG. 20A, the control area 20 that was mostly at the front of the mouse is now angled back along the right front half of the mouse and ring finger support 23 is formed along the bottom of the control area 20. The adjusted shape also forms a thumb cradle 25 that is a large contour approximately one fourth the width of the mouse and three fourths of the length. FIG. 21A, a rear view of the adjusted shape, thumb cradle 25 indents down and into the left side of adjustable computer mouse 10. During adjustment, the user may also push down on the top 12 of the mouse. This provides additional shell material for contouring for the thumb and fingers and also forms upper lift area 24.

Once adjustment is complete, shape of the adjustable computer mouse 10 should not change significantly and the core must be firm enough so that control module 200 does not have noticeable movement from ordinary activation of the buttons. This capability is dependent on the tensioning of flexible shell 15 which forms a unified firm structure supported by the core assembly 50. Flexible shell 15 needs to be tensioned in the horizontal direction around the core to maintain proper packing of the aggregate 52 and desired air volume ratio in the core 50. This is accomplished by stretching a sheet of shell material, of a predetermined cut related to the exact perimeter shape of base 100, so it encloses the base perimeter, core 50, and control module 200. A shell material joint 40 may be required to form the shell material into the desired tension structure. A flexible shell 15 that is also tensioned in the vertical direction will tend to "bridge" contours in the underlying core. For this reason, vertical tensioning should be minimal so that the shell material can follow the contours of the core 50. If there are any areas where the shell material has a tendency to not follow the shape of the core, an adhesive, glue, or other similar method may be used to attach the shell 15 and padding 72 to core sack 54.

Figure 22:
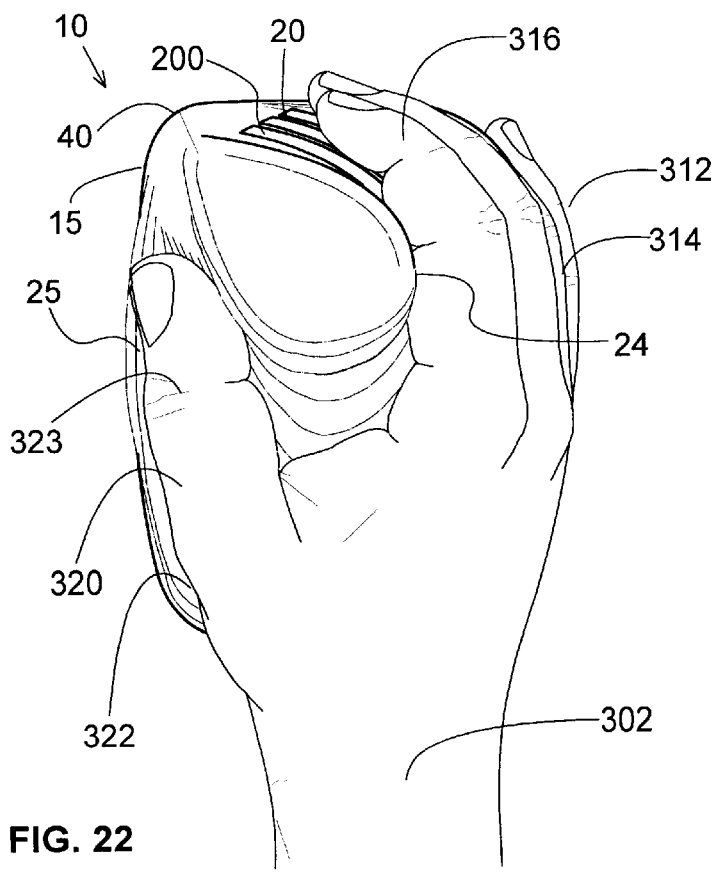
FIG. 22 is a top view of the adjustable computer mouse of FIG. 1 shown supporting a right hand.

As shown in FIG. 22, a top view of the adjustable computer mouse 10 supporting a hand, the hand is resting on its side in a relaxed partially open position with the fingers loosely curled around the front of the control area 20. FIG. 22 also shows the thumb 320 is supported in a natural open position by thumb cradle 25. Other prior art vertical mice do not have a full sized thumb support and in fact encourage using the thumb in combination with the index and other fingers to maneuver the mouse. This causes the thumb's Interphalangeal (IP) joint 323 to be subject to continual maximum hyperextension and flexion bending which is not normal for the thumb 320. This can result in undue strain and eventual discomfort or RSI damage to the thumb's tendons. The present invention, by fully cradling the thumb 320, provides a comfortable relaxed position for the thumb.

Figure 23:
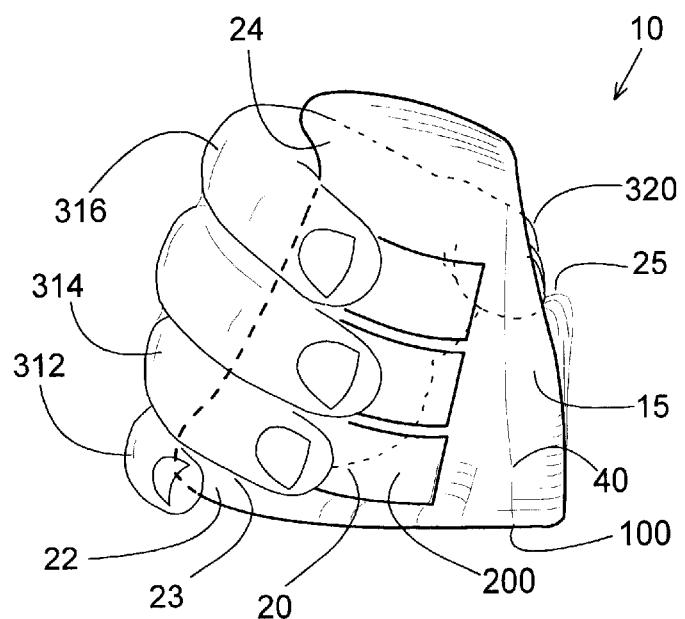
FIG. 23 is a front view of the adjustable computer mouse of FIG. 1 shown supporting a right hand.

Additionally, the present invention is uniquely able to adjust the height at which the thumb is supported. This is a benefit because the elevation of the thumb largely determines the degree of vertical alignment of the hand as shown in FIG. 23, a front view of the adjustable computer mouse 10 supporting a hand. A vertically oriented hand does not require pronation, which forces the hand, wrist, and arm into a twist that causes strain. Most prior art mice force the hand into a generally horizontal pronated position where the wrist 302 can only bend in the radial/ulnar deviations which have a very limited scope of movement and causes additional strain. In contrast, the present invention allows the wrist to bend in flexion/ extension which has a wide range of flexibility without strain. Other vertically oriented prior art mice cannot adjust their thumb support to provide the ideal vertical alignment of the hand and wrist.

FIG. 23 also shows the small finger 312 supported by small finger area 22 in a somewhat straighter position so that it is not directly under the ring finger 314. Prior art vertical mice provide an undercut for the small finger 312 which causes the finger nail to contact the underside of the ring finger 314, causing irritation after extended use. The present invention prevents this discomfort by placing the small finger 312 so its nail does not rub against the ring finger 314. Also shown on FIG. 23 is upper lift area 24, located at the top of the index finger 316. Upper lift area 24 cantilevers out so that the index finger 316 engages the surface when the finger is lifted. This, coupled with the thumb 320 engaging the thumb cradle 25, enables the hand to lift the mouse with little additional gripping effort. This avoids the awkward and uncomfortable grip required to reposition the mouse on the underlying surface and unlike prior art mice that use an undercut along the bottom to enable lifting, the present invention's upper lift area 24 is available to all hand sizes.

FIG. 23 also shows that ring finger 314 rest on ring finger support 23. This provides a support mechanism for the ring finger 314 and middle and index fingers which allows the fingers to rest easily along the control area 20 without activating a button. Additional support for the hand is also shown in FIG. 22. The area of the palm adjacent to the thumb (the thenar eminence) 322 is supported by a palm support surface 26. This area, together with thumb cradle 25, accepts the load of supporting the hand in a vertical position by transferring the force into a downward direction. Prior art vertical mice have a narrow base and rely on lateral loading of a finger supporting surface to keep the hand upright. Lateral loading translates into a horizontal force that tends to either unbalance the distribution of weight or require an opposing lateral force. The opposing lateral force is usually supplied by the thumb gripping in constant tension. The present invention avoids this problem. As shown in FIGS. 20 and 21 has a wide base that provides a stable foundation for a structure that supports the hand in a four point system consisting of the supported thumb 320 and thumb palm area 322, together with supported ring finger 314 and the side of the hand and extended small finger 312 resting on the underlying surface. This enables operation of a mouse with no gripping tension.

In the preferred embodiment shown, the adjustable computer mouse 10 is not an amorphous bag of putty or sand, but is adjustable to bring targeted ergonomic configurations to a wide range hand shapes and sizes and decreases arm, elbow, and shoulder fatigue and reduce the chance of injury associated with extended heavy use. Additional superior ergonomics are specifically provided by the length and shape of the buttons which supports a variety of finger positions and hand sizes that have relatively low activation effort along the length of button.

Finally, the invention provides opportunity for novel design features, such as animal shapes, or other non-mouse functionality that does not interfere its chief purpose as a computer mouse. Alternative ergonomic or ascetic values can be obtained by applying an alternate fabric, for example felt of approximately 1.5 mm, to the button faces. Other materials can be used for the indicators including, but limited to; leather, rubber, plastic, metal, even non-ergonomic centric designs such as decorative eyes or paws if the button is on a mouse that resembles an animal.

The above description and accompanying examples are for purposes of providing a complete understanding of the invention. They are not meant to limit the invention to the particulars as included. The specific details are provided only to fully explain the principles of the invention as a basis for variations and modifications as possible within the teachings of the invention. In addition being adapted to the well known art of computer mice, the invention can be adapted to other devices requiring grasping and interaction with an individual's hand.

I claim:

1. A computer input device for interactive control of a user interface of a target computing device, comprising:

a base assembly having a rigid flat bottom supported on an underlying flat surface, said base assembly having a predetermined size with a perimeter formed by confluence of curvilinear shapes comprising a front, left side, right side, and back;

said base assembly having structural and electronic elements for accommodating components for generating and outputting positional and event signals to said computing device;

a separate multi-component moldable core having a loose sack containing an aggregate material and means for venting of air from said sack, said moldable core supported by said base assembly;

one or more integrated control modules supported by said moldable core, said control modules having one or more switches, said control modules having one or more buttons where said buttons activate said switches;

said control modules having a flexible electronic connection to electronic components outputting event signals initiated by actuation of said switches;

a structural flexible shell enclosing said base, said separate moldable core, and said control modules, said flexible shell being attached to said base assembly with a predetermined tension and said control modules forming a unified structure;

whereby said computer input device may be adjusted to the hands of a variety of users, by said flexible shell being reshaped at any time by user manipulation of said moldable core, and accordingly changing the relative position of the control module, thereby said computer input device being adjusted to an ergonomic configuration that accommodates the unique shape of the current user's hand, including positioning the control module buttons so that activation requires a minimal of strain and effort by the fingers of the user's hand, said shape remaining static unless further manipulated by a user.

2. The computer input device of claim 1 wherein said base assembly includes a separate sensor housing that encloses electronic and mechanical components that generate and output positional and event signals, said sensor housing providing support for said moldable core and preventing said moldable core from interfering with the function of the components.

3. The computer input device of claim 1 wherein said base assembly includes a backing material preventing said moldable core from interfering with the function of the base electronic and mechanical components and said base components from damaging said sack of said moldable core.

4. The computer input device of claim 1 wherein said oversized core sacks have surface area beyond the minimum required to contain aggregate materials and are formed of a non-porous material selected from the group including polyethylene, rubber, latex, plastic, and fabric.

5. The computer input device of claim 1 wherein said means for venting air consists of a hole or holes in said core sacks and a tube assembly may be attached to said vent hole in said core sacks, said tube assembly have a filter, said tube assembly also may be attached to a vent hole in said base.

6. The computer input device of claim 1 wherein said moldable core includes a loose aggregate formed of a plurality of roughly cylindrically shaped or spherical objects of one or more materials selected from the group including Styrofoam, open cell foam rubber, closed cell poly foam, cotton, silicone, air filled plastic bubbles, and polypropylene beads, said loose aggregate being mixed with a lubricant formed of a material selected from the group including liquid soap, petroleum based liquid oils, gels, and graphite.

7. The computer input device of claim 1 wherein said moldable core includes a loose aggregate formed of a plurality of roughly cylindrically shaped or spherical objects of one or more materials selected from the group including Styrofoam, open cell foam rubber, closed cell poly foam, cotton, silicone, air filled plastic bubbles, and polypropylene beads.

8. The computer input device of claim 1 wherein said moldable core further includes a lubricant formed of a material selected from the group including liquid soap, petroleum based liquid oils, gels, graphite, or synthetic oil or fluid.

9. The computer input device of claim 1 wherein said flexible shell further encloses a padding, said padding being placed in a layer overlaying portions of said moldable core, the padding additionally being placed as shaping fill and to pad fixed shape structures, said padding thereby contributing to the surface regularity of said flexible shell by masking anomalies in said loose sack of said moldable core and masking aggregate bumps, by acting as fill to affect the general shape of the input device, and by padding fixed structures.

10. The computer input device of claim 9 wherein said padding is formed of one or more materials selected from the group including, loose polyester fill or batting, cotton fiber materials, open cell foam rubber, open cell poly foam, or closed cell synthetic foam or poly foam.

11. The computer input device of claim 1 wherein said structural flexible shell is formed of stretch fabric of a predetermined weight and durability.

12. The computer input device of claim 1 wherein said structural flexible shell is formed of a material selected from the group including leather, fabric, rubber, latex, plastic, simulated fur, or multi-layered material with a foam backing.

13. The computer input device of claim 1, further including a means of attachment of said structural flexible shell to said base and to said control modules in a manner to provide a predetermined tension.

14. The computer input device of claim 13 wherein said means of attachment to said based includes a retainer piece and said means of attachment to said control module includes a mounting member.

15. The computer input device of claim 1 wherein said control modules are juxtaposed with said moldable core, with the core providing support to the controls, and having a separate backing material where said control modules is supported by the moldable core.

16. The computer input device of claim 1 wherein said control modules further include an internal secondary lever, said internal lever being actuated by said button, upon actuation said internal lever activates said switch, thereby providing a uniform actuation effort over the length of said button.

17. The computer input device of claim 1 wherein said control modules further include a button travel limit means keeping buttons in line with switch assembly.

18. The computer input device of claim 17, wherein said travel limit means is performed by said internal lever.

19. A computer input device having a structure that conforms to a range of shapes according to intentional adjustment by a user, comprising:

a flat bottom of rigid material with a curved perimeter edge with a front area, a left side area, a right side area, and a back area, and said flat bottom providing a stable base for supporting a body with a shell which is attached along the perimeter edge of the flat bottom, so that said body has surfaces comprising a front area, a left side area, a right side area, and a back area, these areas corresponding to the matching areas of the flat bottom, and these areas of the body conjoin to a top area surface, and all surfaces of the body having curvatures forming a unified shape;

a control module conjoined with a shell and supported by said body, said control assembly including a plurality of individual buttons, with the faces of the buttons meeting the adjacent surfaces of the body so that the buttons follow the shape of the body to form an generally uninterrupted and unitary shape, said button module having elongated buttons along the front and extending along a side with means for uniform ease of actuation over the length of said buttons;

a set of structural elements for mounting the electronic and mechanical components required to communicate the movement of said computer input device over an underlying surface and to communicate activation events of said button module;

wherein when the user exerts a squeezing or pushing force on said body, the shape of the body changes within a certain possible range, and the position of said button assembly is changed within a certain possible range, as influenced by the change in shape of the supporting portion of the body, or as directly acted on by the squeezing force;

wherein said computer input device, unless subject to specific intentional external pressure or force sufficient to manipulate the shape of the body, or to change the position of the button controls, said computer input device retains a generally static shape under normal operation or when not in use.

20. The computer input device of claim 19 wherein said body rises vertically to a predetermined height sufficient to accommodate the location of said button module on the general front and side area of the body in a more or less vertical alignment, with the individual buttons arranged in a generally vertical column, this configuration allowing the user to shape the computer input device for a supporting the hand at multiple points, where the small finger is supported in an open position and resting on the underlying surface, the ring finger supported by a more or less horizontal contour ridge, the index and middle fingers resting above the ring finger where they are positioned for activation of the buttons, the user's thumb cradled in a large indentation in the body, said indentation supporting the full thumb in a straight and relaxed position, the palm area of the user's hand supported by the back area of the body, with the side of the hand resting on the underlying surface, whereby providing a multi-point support for the hand in a relaxed neutral unstrained alignment with the wrist and arm and enabling movement and actuation of said pointing device without the hand having to grip the device in constant tension.

* * * * *